3,522,091
PRESERVATION AND RECOVERY OF THE SUGAR CONTENT OF SUGAR BEETS
Mordecai Lapidot, Bene Beraq, Eliahu Eisenberg, Tel Aviv, Ralph S. Kahan, Ramat-Gan, and Eliahu Foa, Rehovot, Israel, assignors to Isotopes & Radiation Enterprises (Isorad) Ltd., Ramat Aviv, Tel Aviv, Israel, a corporation of Israel
No Drawing. Filed Jan. 15, 1968, Ser. No. 697,639
Claims priority, application Israel, Jan. 20, 1967, 27,288
Int. Cl. C13d 1/00, 1/08
U.S. Cl. 127—43                                                                                4 Claims

ABSTRACT OF THE DISCLOSURE

The sugar value of sugar beets is increased by irradiation with doses of γ-radiation or X-rays up to 10 kilorads. By the irradiation the amount of extractable sugar content during storage is slowed down.

---

This invention relates to the preservation of the sugar content of sugar beets and to the recovery of the sugar from the beets.

It is known that the sugar content of freshly harvested beets decreases rapidly in transport and storage. Moreover, not all the sugar contained in the beet can be extracted from it, irrespective of whether the extraction is performed immediately after the beets have been harvested or at a later stage, but some proportion of sugar remains in the residue.

This invention has the object to provide a process for slowing down the decrease of the sugar content and at the same time increasing the proportion of sugar that can be extracted from sugar beet.

It has already been reported that it is possible to slow down the loss of sugar in storage by irradiation of the sugar beet, before this is put in storage, by means of γ-rays in doses of 10 to 15 kilorads. The reported improvement of sugar preservation thus obtained is of the order of 1 to 1.5%, nominal percent.

The irradiation of vegetable matter with γ-rays has also been proposed for various other purposes, and this always with doses of the order of tens to several hundreds of kilorads. Known applications of γ-irradiation are, for example, the pasteurisation of fruit or vegetables; the acceleration or retarding of the ripening of fruit. It has also been suggested to increase the yield from seeeds such as potatoes, maize, or cottonseed, by irradiation with γ-rays in doses up to one kilorad.

It has now been found, in accordance with this invention, that by irradiating sugar beets at a time as close as possible to their being harvested, with doses of γ-radiation up to ten kilorads, the initial proportion of extractable sugar can be increased by more than two nominal percent, i.e. about 15–16% of the amount of sugar extractable without such irradiation, and that the loss of sugar from beets thus irradiated is much reduced in transport and storage.

Optimal results have so far been achieved with irradiation doses of the order of one kilorad.

Any suitable known source of γ-rays can be used in carrying out the irradiation in accordance with the invention, e.g. cobalt-60 or caesium-137. In the context of this invention, X-rays are to be considered as γ-rays. Of course, the X-ray source will have to work at a sufficiently high energy in order to generate X-rays of adequate penetration. A suitable magnitude of ten magnitude of the energy is in the range from 1 to 3 mv.

The irradiation may be done in batches. In industrial practice, however, continuous irradiation will be preferred. Depending on the strength of the source of radiation, the required doses can be applied to the sugar beets while the latter are carried, e.g. on a conveyor, in on or several runs past the source of radiation.

After the irradiation the beet can be transported, stored and processed in the conventional manner.

The irradiation of sugar beet in accordance with the invention onlly insignificantly adds to the processing costs and provides a consideraly increased sugar yield.

What is claimed is:

1. A process for increasing the amount of sugar that can be extracted from sugar beet and at the same time slowing down the decrease of the sugar content during storage, wherein the beets are irradiated with doses of γ-radiation of an effective amount up to 10 kilorads.

2. A process according to claim 1, wherein the irradiation is carried out continuously by carrying the beets in one or several runs past the source of radiation.

3. A process in accordance with claim 1 wherein said γ-radiation is about one kilorad.

4. A process in accordance with claim 1 wherein said γ-radiation is selected from γ rays from cobalt-60, γ rays from caesium-137 and X-rays in the range of 1–3 mv.

References Cited

UNITED STATES PATENTS 2,721,941   10/1955   McMaster et al. _____ 21—54 X
3,218,188   11/1965   Lippe et al. _____ 27—4

OTHER REFERENCES

Zagrodzki et al.: "The Influence of Ionizing Radiation . . . "Int. Sug. J. 67:15–18 (1965).

Monselise et al.: "Changes in composition . . . "Chem. Abst. 65:7600 (1966).

Kolomiets: "Effect of Radioactive Isotopes on Plant Pigments,' Chem. Abst. 55:17774,5 (1961).

MORRIS O. WOLK, Primary Examiner

D. G. CONLIN, Assistant Examiner

U.S. Cl. X.R.

21—54; 127—2, 42; 204—165; 250—46, 106

UNITED STATES PATENT OFFICE
CERTIFICATE OF CORRECTION

Patent No. 3,522,091          Dated July 28, 1970

Inventor(s) Mordecai Lapidot et al.

It is certified that error appears in the above-identified patent and that said Letters Patent are hereby corrected as shown below:

2) Column 2, line 11, delete "of ten magnitude"

3) Column 2, line 23, correct the spelling of "consideraly" to --considerably--.

4) In the "References Cited", second reference class should be --127-4-- instead of "27-4".

SIGNED AND
SEALED
DEC 29 1970

(SEAL)
Attest:

Edward M. Fletcher, Jr.
Attesting Officer

WILLIAM E. SCHUYLER, JR.
Commissioner of Patents